United States Patent [19]
Matsuzawa et al.

[11] Patent Number: 5,578,999
[45] Date of Patent: Nov. 26, 1996

[54] REMOTE CONTROL WITH LEARNING FUNCTION AND CONFIRMATION THEREOF

[75] Inventors: Kouichi Matsuzawa, Tokyo; Hiroshi Morohoshi, Tokorozawa, both of Japan

[73] Assignee: Casio Computer Co., Ltd., Tokyo, Japan

[21] Appl. No.: 347,042

[22] Filed: Nov. 30, 1994

[30] Foreign Application Priority Data

Dec. 6, 1993 [JP] Japan .................................. 5-339734
Feb. 28, 1994 [JP] Japan .................................... 6-30601

[51] Int. Cl.⁶ .................................................. G05B 19/02
[52] U.S. Cl. ........................... 340/825.22; 340/825.72; 348/734; 345/169; 359/142
[58] Field of Search ...................... 340/825.22, 825.24, 340/825.25, 825.69, 825.72; 348/734; 359/142, 148; 341/23; 345/169

[56] References Cited

U.S. PATENT DOCUMENTS

| | | | |
|---|---|---|---|
| 4,825,200 | 4/1989 | Evans et al. | 340/825.72 |
| 4,837,414 | 6/1989 | Edamula | 340/825.22 |
| 5,028,919 | 7/1991 | Hidaka | 340/825.72 |
| 5,237,319 | 8/1993 | Hidaka et al. | 340/825.72 |
| 5,237,327 | 8/1993 | Saitoh et al. | 340/825.72 |
| 5,450,079 | 9/1995 | Dunaway | 341/23 |

FOREIGN PATENT DOCUMENTS

0566516A1 10/1993 European Pat. Off. .
2238146 5/1991 United Kingdom .

OTHER PUBLICATIONS

Patent Abstracts of Japan, vol. 7, No. 251 (E–209) Nov. 8, 1983 & JP–A–58 138 137 (Oki Denki) Aug. 16, 1983.

*Primary Examiner*—Michael Horabik
*Assistant Examiner*—Edward Merz
*Attorney, Agent, or Firm*—Frishauf, Holtz, Goodman, Langer & Chick

[57] ABSTRACT

A remote control device including a receiver for receiving a control signal which remotely controls an external device, a RAM for storing the received control signal in correspondence to a respective one of keys, a transmitter for reading a control signal corresponding to an operated key from the RAM and transmitting the read control signal, and a display for displaying the stored data in the RAM when the control signal is received/transmitted. In a first aspect, when an external control signal is received and stored for any key, a key for which no control signal is stored is detected from the RAM and displayed on the display. When a control signal is transmitted, a key for which a control signal is stored in the RAM is detected and displayed on the display. In a second aspect, when an external control signal is received, a detector detects the contents of the received control signal, which are then displayed on the display. By such arrangement, when a control signal is transmitted/received, the user can easily know a key to be operated and whether the external control signal has been received correctly.

12 Claims, 16 Drawing Sheets

FIG.4A

OPERATED KEY | DISPLAY CONTENTS

| LEARN | 3k

| 7 | 3a

```
+  −
×  ÷   1 2 3
=           LEARN
       4 5 6 7 8 9 0 .
```
— 11

FIG.4C

```
+  −
×  ÷   1 2 3
=           LEARN
       4 5 6 7̇ 8 9 0 .
```
— 11

FIG.4D

| RMT | 3j

```
          REMOTE
          CONTROL
          MODE
  7
```
— 11

FIG.4E

| 7 | 3a

```
          REMOTE
          CONTROL
          MODE
              📶
  7
```
— 11

MARK INDICATING THAT REMOTE CONTROL SIGNAL IS UNDER TRANSMISSION

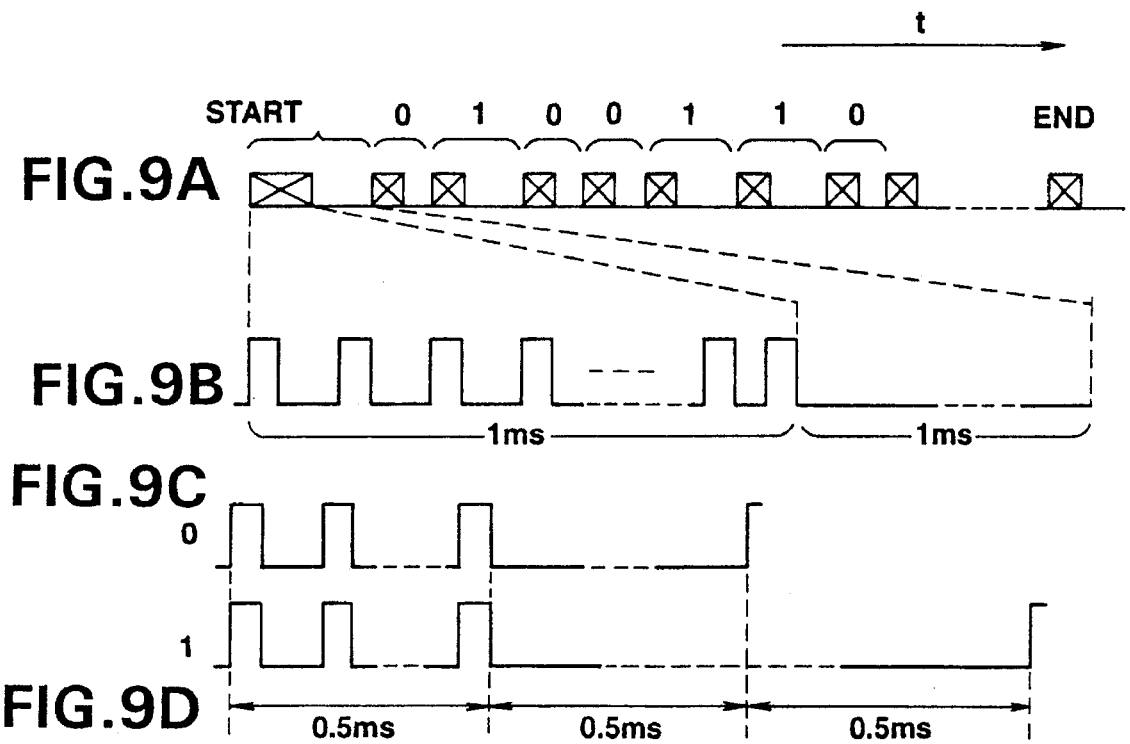
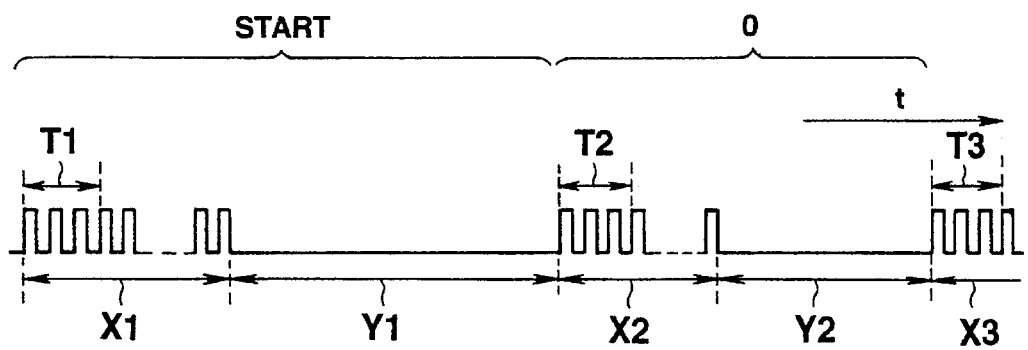

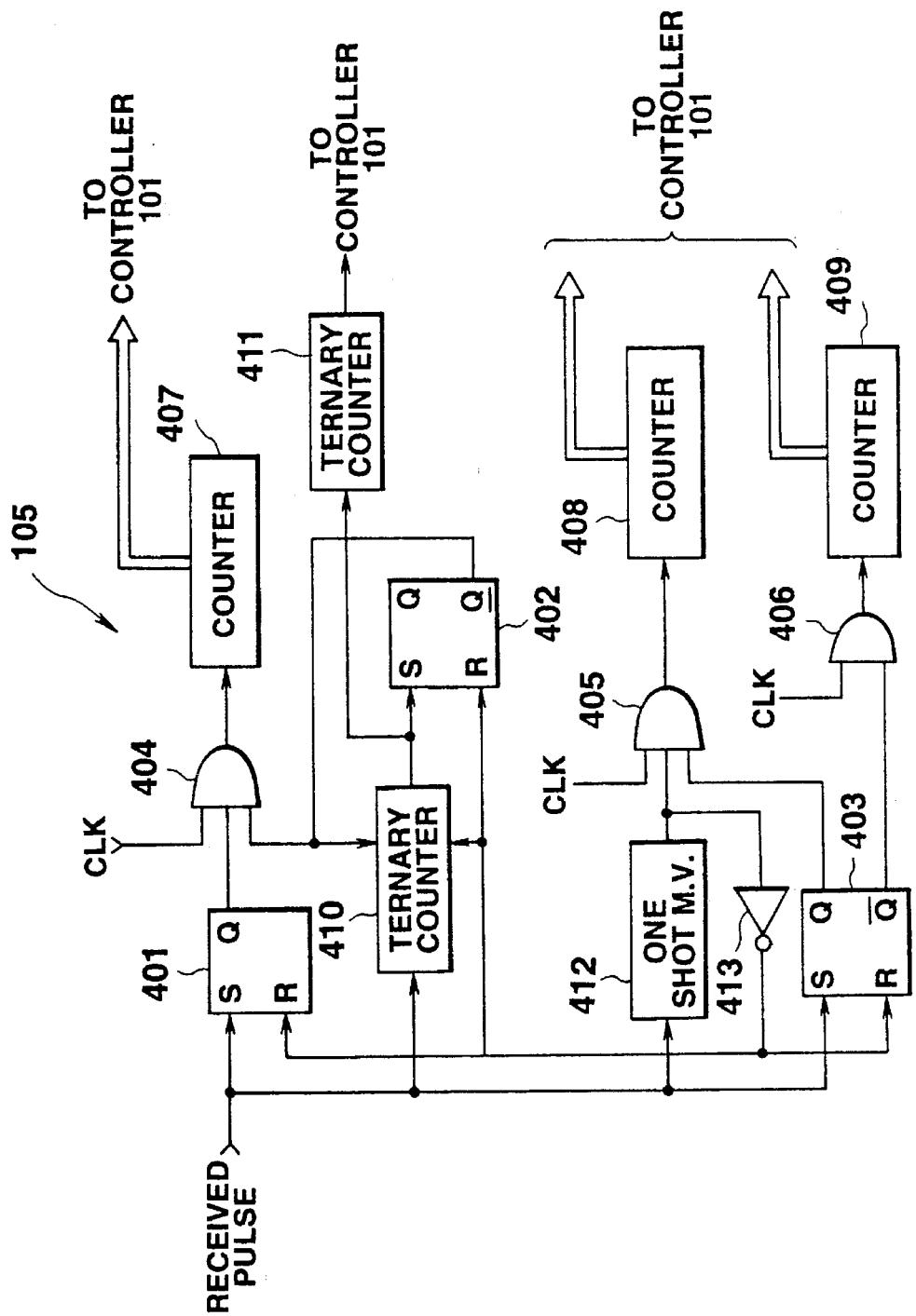

RAM 111

| DISPLAY REGISTER | | | | | |
|---|---|---|---|---|---|
| M | B | C | TIME REGISTER | | |
| WORK AREA | | | | | |
| WORK AREA | | | | | |

18
17

RAM 111

CATEGORY TABLES

| | | |
|---|---|---|
| C0 | 1.00ms | 2.00ms |
| C1 | 0.50ms | 1.00ms |
| C2 | 0.50ms | 1.50ms |
| C3 | 0.75ms | 2.00ms |
| | | |
| | | |

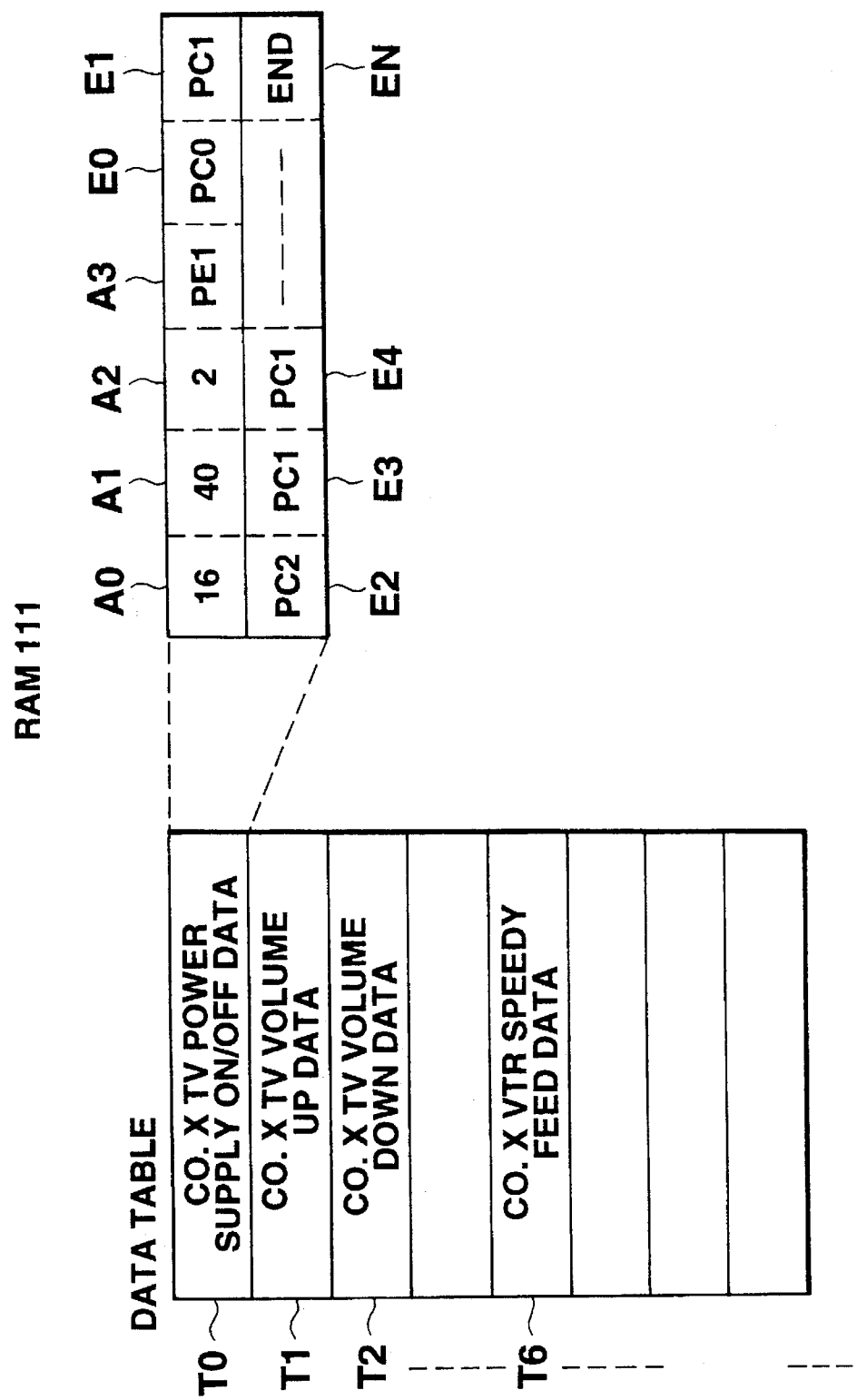

| 5μs | 20μs | 1ms | 1ms | 0.5ms | 0.5ms | 0.5ms | 1ms | . . . . . . . |

| F5 . 34 . 0464 |
|---|

REMOTE CONTROL WITH LEARNING FUNCTION AND CONFIRMATION THEREOF

BACKGROUND OF THE INVENTION

1. Field of the Invention

The present invention relates to remote control devices which have a learning function which includes receiving and storing a control signal, and more particularly to such device in which a learned state of a control signal by the learning function is easily confirmed.

2. Description of the Related Art

Recently, with the development of electronic techniques, electronic devices such as television sets, video tape recorders and stereophonic devices have a remote control device annexed thereto.

The remote control devices annexed originally to specified electronic devices (hereinafter referred to as "pure" remote control devices) manufactured by any particular maker are not usable with electronic devices of different kinds and makers or with different kinds of electronic devices. The number of different remote control devices would increase in direct proportion to the number of different kinds of electronic devices and the number of different makers.

Recently, learning remote control devices have been proposed as ones adaptable to electronic devices of different kinds and/or makers.

The learning remote control device is adapted to be used as a remote control device for different electronic devices in that the learning remote control device receives a control signal delivered by a "pure" remote control device and stores it in a memory in correspondence to a key, reads from the memory the control signal stored in correspondence to the operated key, and sends the control signal.

Therefore, a key for which the control signal is stored cannot be specified (in other words, a key for which no control signal is stored cannot be specified). Thus, when an electronic device is to be operated remotely by a learning remote control device, it is unclear which key should be operated. In addition, when a control signal is to be newly stored in the learning control device, an idle key for which no remote control signal is stored cannot be identified, disadvantageously. Furthermore, when a control signal from the pure remote control device was tried to be stored, it cannot be recognized whether the control signal was correctly received and stored in the memory.

For example, before the maker forwards the articles, it confirms the learning function of remote control devices about whether the control signal can be learned correctly to ensure the quality of the articles, by causing the control signal to be actually learned. To this end, a dedicated device is required to be connected to each of the remote control devices. Thus, considerable time and labor are required for confirmation of the learning function and hence the efficiency of the work would be reduced undesirably.

SUMMARY OF THE INVENTION

It is therefore an object of the present invention to provide a remote control device which specifies an operated key for which a control signal is set (in other words, an idle key for which no control signal is set) and facilitates confirmation about whether the control signal has been stored correctly.

In order to achieve the above object, the present invention provides a remote control device for remotely controlling various external devices, the various external devices being controlled by respective remote control signals sent from their accessory remote controllers, the remote control device having a learning function of receiving and storing a remote control signal sent from the accessory remote controller, and a sending function of sending the stored remote control signal to control a pertinent external device, comprising:

key-in means including plural keys which are prepared for remotely controlling the various external devices respectively;

control signal memory means for storing a remote control signal sent from an accessory remote controller of an external device, when one of said plural keys is operated; and display means for indicating the key, the remote control signal corresponding to which key has been stored in said control signal memory means.

Thus, according to the present invention, the control device is operated without doubt, and whether the control signal has been stored correctly can be confirmed easily.

BRIEF DESCRIPTION OF THE DRAWINGS

FIGS. 4A–4E show key selections, wherein FIGS. 4A–4C show key selection in a learning mode and the related contents displayed on a display screen, and FIGS. 4D and 4E show key selection in a remote control mode and the related contents displayed on a display screen;

FIG. 9A illustrates a general control signal;

FIG. 9B illustrates the series of burst pulses followed by a low-level quiescent period of the leader pulse signal of the control signal of FIG. 9A;

FIG. 9C illustrates a "0" signal of the control signal of FIG. 9A;

FIG. 9D illustrates a "1" signal of the control signal of FIG. 9A;

FIG. 10 is a block diagram of a reception control unit of the remote control device of the second embodiment;

FIG. 11 illustrates reception of a control signal;

FIG. 14 illustrates further contents of data stored in the RAM;

DETAILED DESCRIPTION OF THE PREFERRED EMBODIMENTS

Embodiments of a remote control device according to the present invention will be described below with respect to the accompanying drawings.

FIRST EMBODIMENT (FIGS. 1–6)

Figure 1:
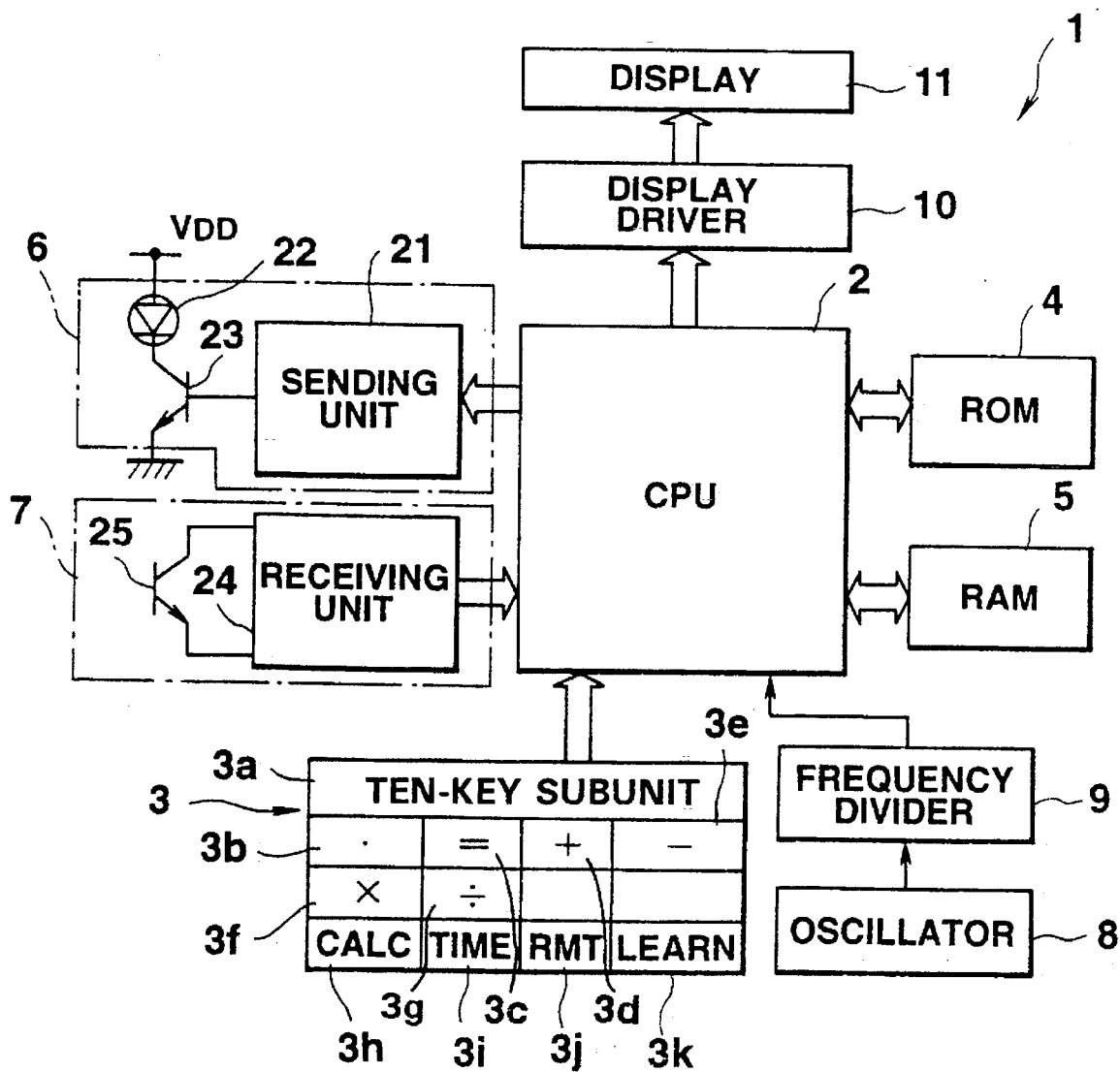
FIG. 1 is a block diagram of one embodiment of a remote control device according to the present invention.

Referring to FIG. 1, a first embodiment of a remote control device 1 according to the present invention takes the form of a wrist watch which includes a CPU (Central Processing Unit) 2, a key-in unit 3, a ROM (Read Only Memory) 4, a RAM (Random Access Memory, shown in more detail in FIG. 2) 5, a transmitter 6, a receiver 7, an oscillator 8, a frequency divider 9, a display driver 10 and a display 11.

As shown in FIG. 1, the key-in unit 3 includes various keys to operate the remote control device 1; for example, a ten-key subunit 3a, a decimal point (".") key 3b, an equal ("=") key 3c, a plus ("+") key 3d, a minus ("−") key 3e, a multiplication ("×") key 3f, a division ("÷") key 3g, a calculation key 3h which sets various processing modes of the remote control device 1, a timepiece key 3i, a remote control key 3j and a learning key 3k. When one of those keys is operated, corresponding key data is output to the CPU 2. The calculation key 3h is used to set the processing mode of the remote control device 1 at a calculation mode; the timepiece key 3i is used to set the processing mode at a timepiece display mode; the remote control key 3j is used to set the processing mode at a remote control mode where a control signal corresponding to a key operated thereafter is sent to an electronic device for remote control purposes; and the learning key 3k is used to set the processing mode at a learning mode where a control signal is received from another remote control device such as a "pure" remote control device and stored in the RAM 5 in correspondence to the key operated already at that time.

The ROM 4 stores system data and a control program which are used to control the respective elements of the remote control device 1.

Figure 2:
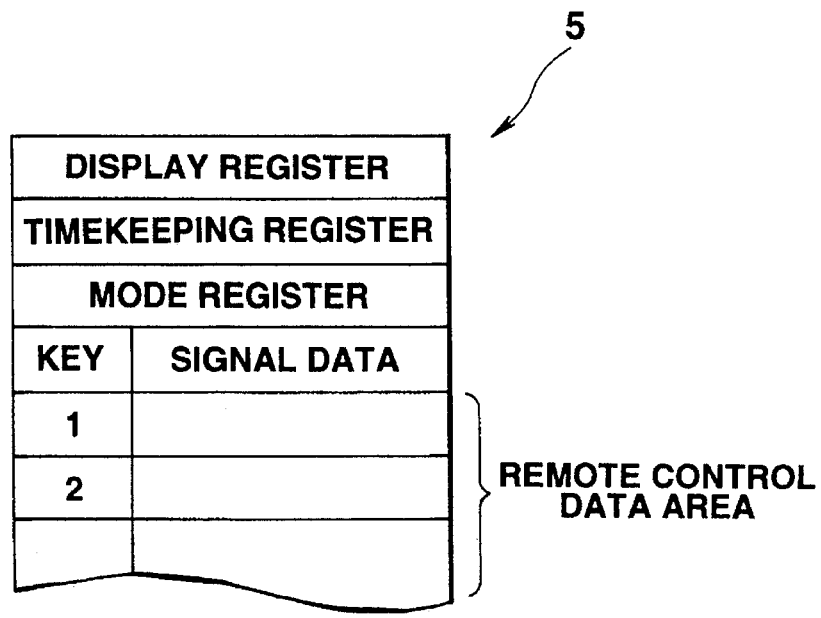
FIG. 2 shows a part of a format in a RAM of the remote control device of FIG. 1.

Referring now to FIG. 2, the RAM 5 is used as a work memory which includes a display register which stores data displayed on the display 11 to be described later, a timekeeping register which records and displays time, a mode register which stores mode flags selected by the respective mode setting keys 3h–3k, and remote control data area provided for the respective keys 3a–3g other than the mode setting keys to store learned control signals.

The CPU 2 controls the respective elements of the remote control device 1 on the basis of keyed-in data from the key-in unit 3 in accordance with the program in the ROM 4 to cause the controller 1 to fulfill its functions. Especially, the CPU 2 performs a process corresponding to a mode selected by any one of the mode keys 3h–3k of the key-in unit 3.

The transmitter 6 includes a sending unit 21, an LED (Light Emitting Diode) 22 and a transistor 23. The sending unit 21 receives remote control data read by the CPU 2 from the ROM 4 in accordance with data keyed in from the key-in unit 3 to turn on/off the transistor 23 to thereby turn on/off the LED 22 connected to the transistor 23 to send an optical signal, for example, having an infrared wavelength as a remote control signal to a photodetector of an operated medium (not shown).

The receiver 7 includes a receiving unit 24 and a phototransistor 25. The phototransistor 25 receives a remote control signal, for example, from the pure remote control device, converts it to a photocurrent which is then fed to the receiving unit 24, which converts the photocurrent to a control signal, which is then fed to the CPU 2. The CPU 2 stores the control signal received from the receiving unit 24 in the remote control data area in the RAM 5 in correspondence to that of the keys 3a–3g operated already at the key-in unit 3 at that time, as will be described later in more detail.

The oscillator 8 generates a clock signal having a predetermined frequency, which is then delivered to the frequency divider 9. The frequency divider 9 divides the received clock signal from the oscillator 8 to form a basic clock signal, which is then output to the CPU 2. The CPU 2 performs control timing operations on the respective elements of the device on the basis of the basic clock signal and uses the timekeeping register in the RAM 5 to record/display the current time.

The display 11 includes, for example, an LCD (Liquid Crystal Display) which displays various items of information required by the remote control device 1, and especially items of information on a key of the key-in unit 3 corresponding to the learned control signal stored in the RAM 5 and on keys of the key-in unit 3 for which no control signals are set (recorded), as will be described later in more detail.

The display driver 10 drives the display 11 on the basis of display data received from the CPU 2 to display the display data on the display 11. More specifically, the CPU 2 reads and outputs display data stored in the display register of the RAM 5 to the display driver 10, which drives the display 10 on the basis of the data for displaying purposes.

The present embodiment is characterized in that a busy key for which a control signal is stored and learned in the remote control data area of the RAM 5, and idle keys are displayed on the display 11 to improve the convenience of use of the remote control device 1.

The operation of the remote control device 1 of the present embodiment will be described next with respect to FIGS. 3–6.

Figure 3:
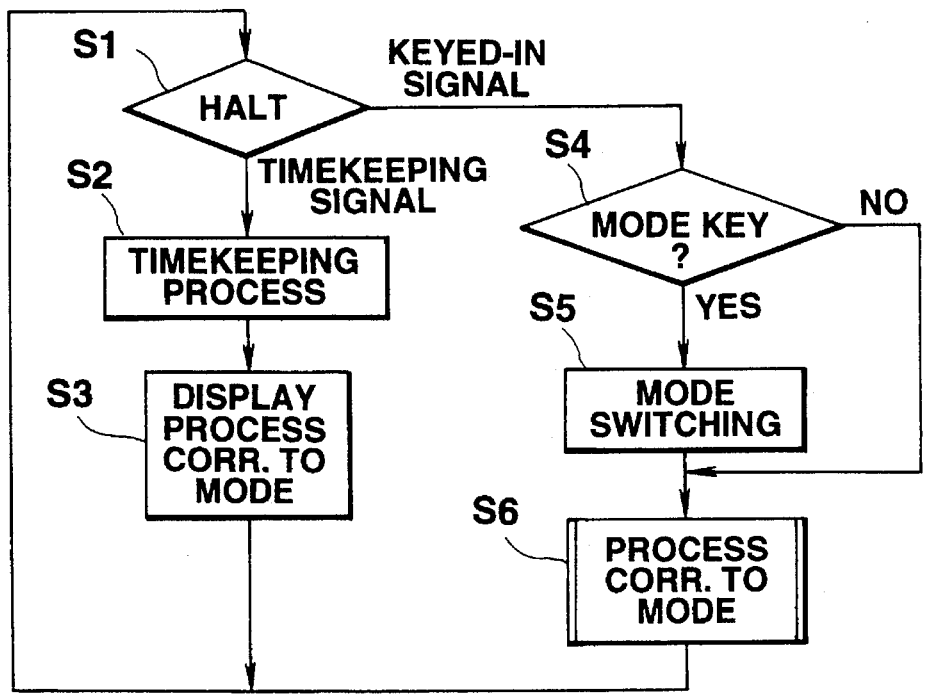
FIG. 3 is a flowchart indicative of a main process performed by the remote control device of the embodiment.

The remote control device 1 is timed so as to perform the respective steps of a main process of FIG. 3. More particularly, as shown in FIG. 3, the CPU 2 checks whether a keyed-in signal is received from the key-in unit 3 in its halt state (step S1). If no keyed-in signals are received from the key-in unit 3 and a basic clock is received from the frequency divider 9, the CPU calculates the current time on the basis of the basic clock and the current time data stored in the timekeeping register of the RAM 5 to write the calculated current time data into the timekeeping register of the RAM 5 (step S2).

At this time, the CPU performs a display process corresponding to the current set mode (step S3) and then returns to the halt state of step S1.

In this display process, when the CPU 2 looks up the mode flag stored in the mode register of the RAM 5 to determine that the current mode is a timepiece mode, the CPU writes the current time calculated at step S2 into the display register and displays this data on the display 11 through the display driver 10. When the CPU 2 determines that the current mode is a remote control one, the CPU displays on the display 11 a key for which a remote control signal is set in the RAM 5. When the CPU determines that the current mode is a learning mode, it displays on the display 11 keys for which no remote control signals are set in the RAM 5.

At step S1 when there is a keyed-in signal from the key-in unit 3, the CPU 2 checks whether the operated key is any one of the mode keys 3h–3k on the basis of the keyed-in signal (step S4).

At step S4 when the operated key is one of the mode keys 3h–3k, the CPU performs a mode switching process on the basis of that key (step S5) to perform the corresponding process and then returns to step S1 (step S6).

At step S4, when the operated key is not any of the mode keys 3h–3k, the CPU performs a process corresponding to the mode in which the key is operated on the basis of the operated key (step S6) and then returns to step S1.

A remote control mode and a learning mode in the mode process at step S6 will be described next which respectively involve the display of an operated key for which a control signal is set in the RAM 5 and an idle key for which no control signal is set, which are the features of the present invention.

As shown in the left-hand portion of FIG. 4A, when a learning key 3k is operated at the key-in unit 3, the CPU 2 selects a learning mode in a mode selecting process at step S5 of FIG. 3 and performs a learning mode process at step S6.

Figure 5:
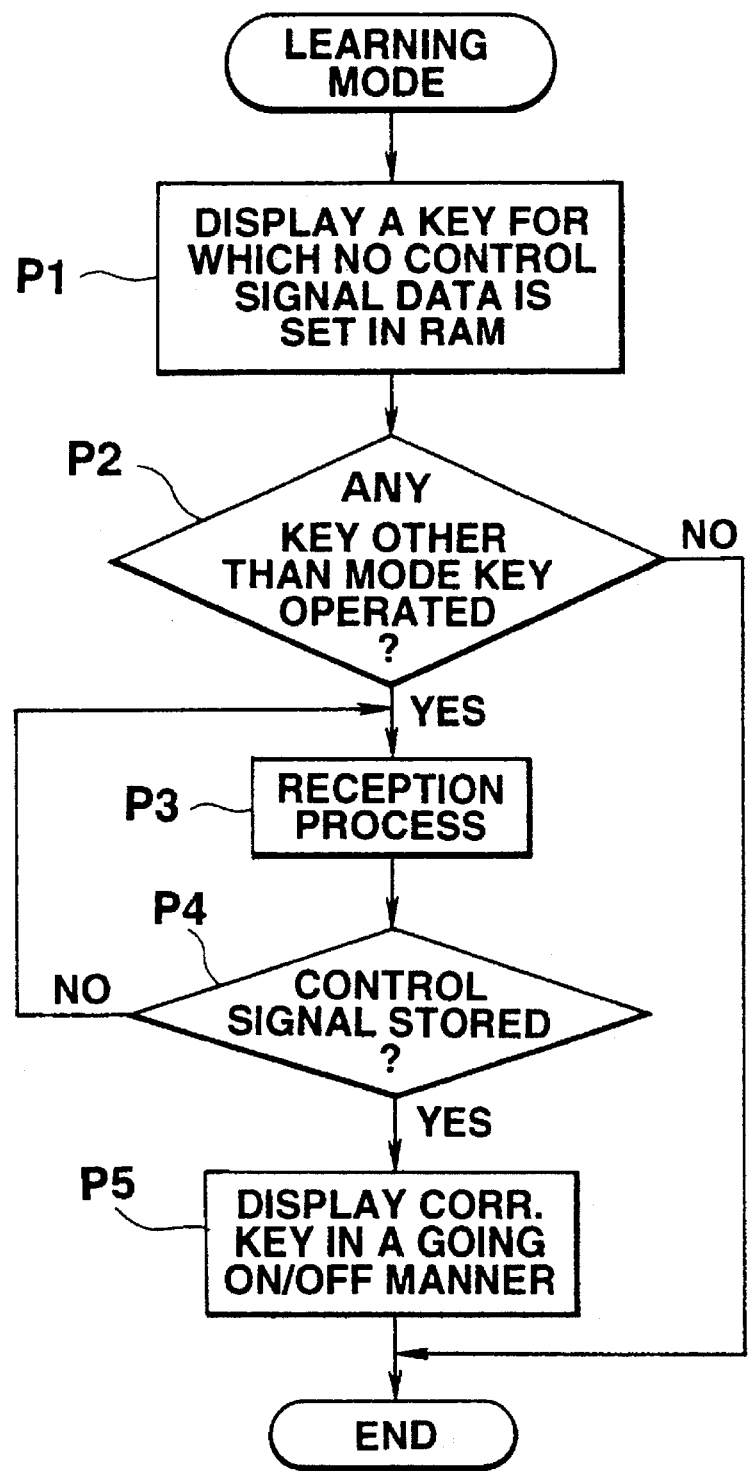
FIG. 5 is a flowchart indicative of a learning mode process performed by the remote control device of the embodiment.

As shown in FIG. 5, in this learning mode process, first, the CPU 2 retrieves a remote control data area of the RAM 5 to extract an idle key for which no control signal is set (recorded) and writes data on this key into the display register of the RAM 5. The CPU 2 reads the key data written into the display register to display this data through the display driver 10 on the display 11 for knowing purposes, as shown in the right-hand half of FIG. 4A (step P1).

Thus, in the learn mode, first, the idle key for which no control signal data is set in the RAM 5 is displayed on the display 11 for knowing purposes.

When the CPU 2 displays the idle key for which no control signal data is set, it checks whether any key other than the mode keys 3h–3k has been operated (step P2). If any one of the mode keys 3h–3k is operated, the CPU determines that mode selection is instructed to end the learning mode and performs mode selection in the main process of FIG. 3 (step S5).

At step P2 when any key other than the mode keys 3h–3k is operated, the CPU performs a reception process in which a control signal is received and stored in the remote control data area of the RAM 5 in correspondence to that key (step P3).

In this reception process, a control signal received from a pure remote control device of an operated medium, for example, a television set, remotely controlled by the remote control device 1 is stored in the RAM 5 in correspondence to the key operated at that time, for example, a key "7" of the ten-key subunit 3a, as shown in the left-hand portion of FIG. 4B. More specifically, a remote control signal generator (for example, an LED) of a pure remote control device of the other party and a phototransistor 25 of the remote control device 1 are set opposite each other. A predetermined key of the pure remote control device of the other party and an intended one of the keys 3a–3g of the remote control device 1 are then operated simultaneously. In this case, the phototransistor 25 of the remote control device 1 receives a remote control signal from the pure remote control device of the other party. The receiving unit 24 of the remote control device 1 converts this remote control signal to a control signal, which is output to the CPU 2. The CPU 2 stores the received control signal in the remote control data area of the RAM 5 in correspondence to that of the keys 3a–3g operated at the key-in unit 3.

The CPU 2 then checks whether the control signal has been written (stored) in the RAM 5 (step P4). If not, the CPU continues to perform the reception process at step P3 performed so far. If so at step P4, key indication corresponding to the key operated when the control signal was received is caused to go on/off, as shown in FIG. 4C, to thereby display the completion of the writing of data in the RAM 5 and end the learning mode process (step P5).

In the learning mode process, an idle key for which no control signal is set in the remote control data area of the RAM 5 is displayed on the display 11 and can easily be known as one for which a new control signal is allocatable to thereby improve the convenience of use of the remote control device 1 in the learning mode.

The remote control key 3j of the key-in unit 3 is operated to select a remote control mode at step S5 of the main process of FIG. 3. A remote control process at step S6 will be described with respect to FIG. 6.

First, as shown in the left-hand portion of FIG. 4D, when the remote control key 3j of the key-in unit 3 is operated, the CPU 2 sets the remote control mode in the mode selection process at step S5 of FIG. 3 to thereby perform a remote control mode process as the mode process at step S6.

Figure 6:
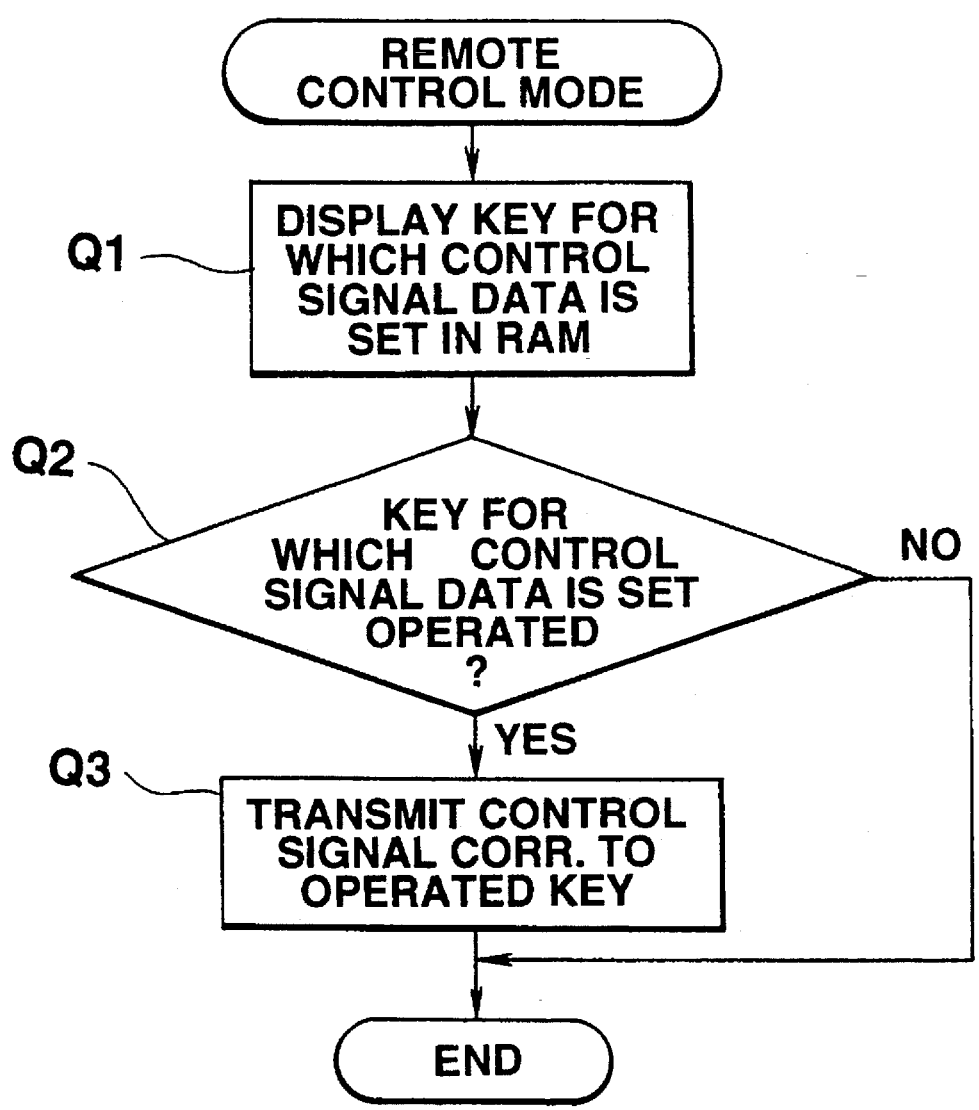
FIG. 6 is a flowchart indicative of a remote control mode process performed by the remote control device of the embodiment.

As shown in FIG. 6, in the remote control mode process, first, the CPU 2 retrieves the remote control data area of the RAM 5 to extract a key for which a control signal is set and displays that key through the display driver 10 on the display 11 for knowing purposes, as shown in the right-hand portion of FIG. 4D (step Q1).

That is, as a result, the user of the remote control device 1 selects and operates a key of the key-in unit 3 having a function to be fulfilled in view of the key displayed on the display 11 to operate the remote control device 1 easily.

When the key for which the control signal data is set is displayed, the CPU 2 checks whether the key for which the control signal data is set has been operated (step Q2). If a key other than the key for which the control signal data is set is operated, and the operated key is one of the mode keys 3h–3k, the CPU ends the remote control mode process to change the mode in the main process of FIG. 3. If the operated key is other than the mode keys 3h–3k, the CPU ends the remote control mode process directly.

At step Q2 when a key for which a remote control signal data is set, for example, a key "7" of the tenkey subunit 3a for which a control signal data is set in the learn mode is operated, as shown in the left-hand portion of FIG. 4E, the CPU 2 reads control signal data corresponding to the operated key from the remote control data area of the RAM 5, and outputs the read data to the sending unit 21, which turns the transistor 23 on/off on the basis of the remote control signal data. This causes the LED 22 to go on/off to transmit a remote control signal to thereby end the remote control mode (step Q3). In this case, the CPU 2 displays the characters "remote control mode" and a mark indicating that the remote control signal is under transmission, as shown in the right-hand portion of FIG. 4E.

As just described above, in the remote control mode a key for which a control signal is set in the remote control data area of the RAM 5 is displayed on the display 11 and known to thereby improve the convenience of use of the remote control device 1.

In summary, in the first embodiment of the remote control device according to the present invention, a busy one of the keys 3a–3k of the key-in unit 3 for which a control signal is stored in the remote control data area of the RAM 5 and an idle key for which no control signal is stored in the RAM 5 are displayed, and hence known easily to thereby improve the convenience of operating an electronic device, using the remote control device 1 or storing a control signal additionally in the remote control device 1.

SECOND EMBODIMENT (FIGS. 7–20)

Figure 7:
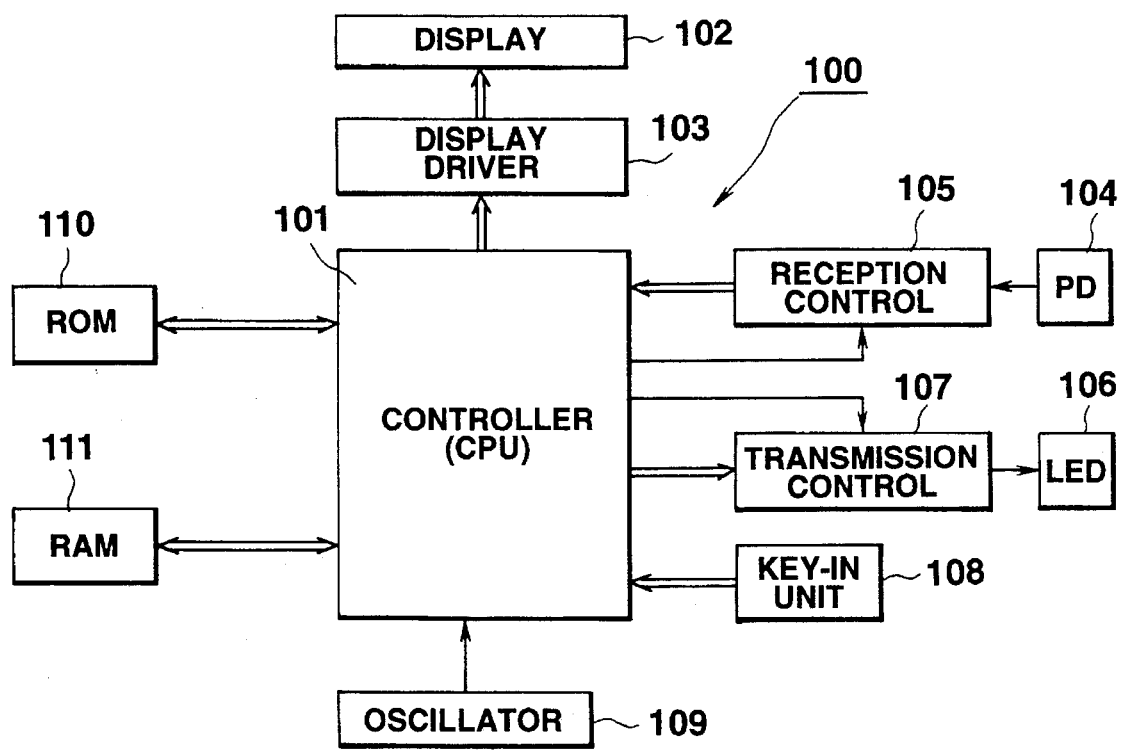
FIG. 7 is a block diagram of a second embodiment of the remote control device according to the present invention.

Referring to FIG. 7, a remote control device 100 as a second embodiment of the present invention includes a controller 101 which controls the whole device, a liquid crystal display 102 which displays the current time, etc., a display driver 103 which drives the display 102, a photodiode 104 which receives an infrared control signal to be learned, a reception control unit 105 which receives a control signal received by the photodiode 104, analyzes the structure of the control signal and delivers the result of the analysis to the controller 101, an LED 106 (including an LED driver) which outputs an infrared remote control signal, a transmission control unit 107 which drives the LED 106, a key-in unit 108 including various keys, an oscillator 109 which outputs a clock signal having a predetermined frequency to control the whole device, a ROM 110 which stores various control programs for control of the whole device, a RAM 111 which stores data on the result of the analysis of the control signal received by the photodiode 104.

Figure 8:
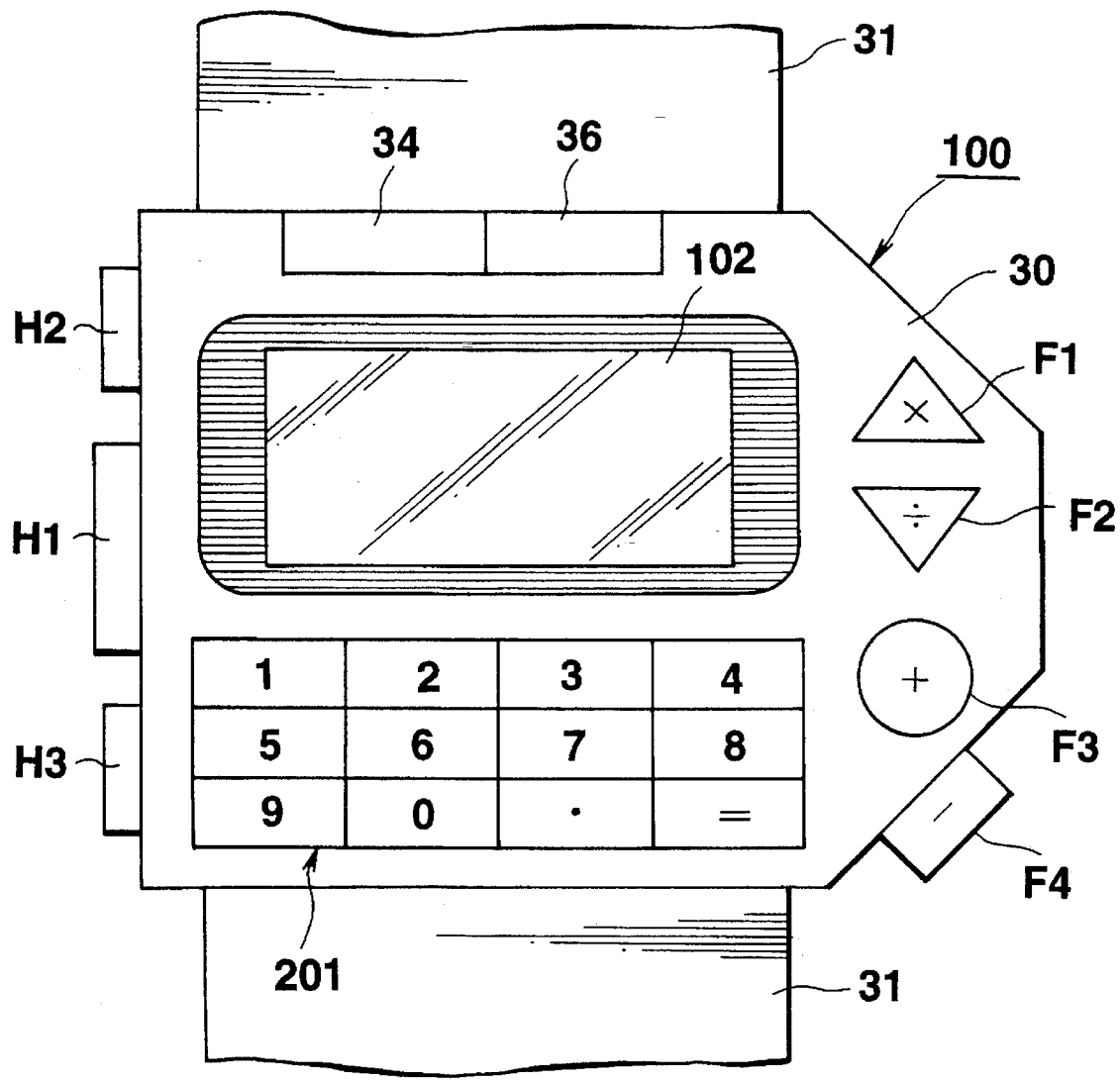
FIG. 8 shows the appearance of the remote control device of the second embodiment.

FIG. 8 shows the appearance of the remote control device 100 of the present embodiment. In FIG. 8, a case 30 has a pair of bands each attached to a respective one of the opposite sides of the case so as to be worn on a wrist. Keys H1–H3 to be described later in more detail are provided on the left-hand edge of the case 30. Although not described in detail, the remote control device has a time display function and a calculating function. The device has keys F1–F4 used as function keys and a ten-key subunit 201 including a "decimal point" key and an "equal" key on the case 30. The photodiode 104 and LED 106 are disposed within compartments 34 and 36 above the display 104 in FIG. 8.

FIG. 9A, 9B, 9C and 9D shows one example of a general infrared remote control signal. The control signal of FIG. 9 includes a leader pulse signal, in FIG. 9B which, in turn, includes a series of burst pulses having a carrier frequency and continuing for 1 ms accompanied by a low-level quiescent period continuing for 1 ms, data pulses and an end pulse.

A control signal used to remotely operate an electronic device such as a television set or video tape recorder is generally composed of digital signals of bits indicative of theoretical values "0" and "1". More specifically, in FIG. 9, a signal unit indicative of "0" or "1" is composed of a carrier output period in which a serial of burst pulses is output and a quiescent period in which a low signal level continues. The kind (category) of signal unit varies in dependence on the length of its quiescent period. The quiescent period is 1 ms when the category of a signal unit is "1", the quiescent period is 0.5 ms when the category of the signal unit is "0" with both their carrier output periods being 0.5 ms. The cycle of burst pulses between the rise of a burst pulse and a rise of the next burst pulse is constant (the inverse of the cycle is the carrier frequency).

Referring back to FIG. 7, the controller 101 stores data on the time obtained by counting clock pulses output from the oscillator 109 in the time register 17 (FIG. 13) of the RAM 111, controls the respective functions and sets processing modes by the operation of the keys H1–H3, F1–F4, and the ten-key subunit 201 to thereby display the modes on the display 102 through the display driver 103.

The reception control unit 105 measures the burst pulse period, carrier output period, and quiescent period of the control signal which the photodiode 104 received and outputs the result of the measurement to the controller 101. When the controller 101 receives the result of the measurement from the reception control unit 105, it calculates the carrier frequency, determines the category of the signal units which constitutes the control signal, and stores (learns) data on the result of the measurement of the control signal in the RAM 111. The controller 101 reads data on the result of the measurement stored in the RAM 111, controls the transmission control unit 107 on the basis of the read data to recover the learned remote control signal. Thus, the LED 106 is driven to transmit the recovered remote control signal.

FIG. 10 is a block diagram of the reception control unit 105, which includes S/R flip-flops 401, 402 and 403; AND gates 404, 405 and 406; counters 407, 408 and 409; ternary counters 410 and 411; a one-shot multivibrator 412; and an invertor 413.

An output pulse of the received control signal from the photodiode 104 of FIG. 7 is input to S (Set) terminals of the S/R flip-flops 401 and 403, the ternary counter 410, and the one-shot multivibrator 412. The one-shot multivibrator 412 is triggered each time it receives a pulse signal to continue to provide an output "1" for a predetermined duration. The output of the multivibrator 412 is input to the invertor 413 and the AND gate 405. Thus, when a burst pulse of the control signal is received, the output of the one-shot multivibrator 412 becomes "1". While the one-shot vibrator 412 receives a series of burst pulses, it maintains a "1" state. As a result, the invertor 413 delivers an output "0" to the R (Reset) terminals of the S/R flip-flops 401, 402 and 403.

When the flip-flop 401 receives the burst pulse, the S/R flip-flop 400 is set and hence its Q terminal output becomes "1". The ternary counter 410 outputs a carrier signal "1" each time it counts four burst pulses. The binary counter 411 outputs a carrier signal each time it counts three received carrier signals. The Q terminal output of the S/R flip-flop 402 maintains the state of "1" until the ternary counter 410 outputs a carrier signal. The AND gate 404 receives the Q terminal output of the S/R flip-flop 401, the $\overline{Q}$ terminal output of the S/R flip-flop 402 and a clock signal of a predetermined frequency from the controller 101 and outputs an AND signal involving those signals to the counter 407. Thus, the counter 407 counts the time between two adjacent carrier signals output from the ternary counter 410.

That is, the counter 407 measures the time of three periods of burst pulses and delivers that time data to the controller 101.

The counter 408 counts clock pulses output from the AND gate 405, which provides an AND output involving the output of the one-shot multivibrator 412, the Q terminal output of the S/R flip-flop 403 and the clock signal. The output of the invertor 413 is "0" and hence the Q terminal output of the S/R flip-flop 403 is "1" so long as the output of the one-shot multivibrator 412 is "1". Thus, the AND gate 405 outputs clock pulses so long as the one-shot multivibrator 412 receives a series of successive burst pulses to provide an output "1". Therefore, the counter 408 counts the clock pulses to measure the carrier output period. When the burst pulses disappear, and the output of the one-shot multivibrator 412 becomes "0", the counter 408 stops its counting operation and the S/R flip-flop 403 is reset. When a series of burst pulses is again received, the counter 408 starts to count the clock pulses again, starting with its reset state. The carrier output period data in the counter 408 is delivered to the controller 101.

The counter 409 counts clock pulses output from the AND gate 406, which delivers an AND output involving a clock pulse and the $\overline{Q}$ terminal output of the S/R flip-flop 403. The $\overline{Q}$ terminal output of the S/R flip-flop 403 is "1" during a quiescent period when the output of the one-shot multivibrator 412 is "0" or when no burst pulses are received. Therefore, the counter 409 counts clock pulses from the AND gate 406 to measure the quiescent period.

As described above, the ternary counter 410 counts burst pulses while the counter 407 measures the corresponding period of time. When the ternary counter 410 outputs a carrier signal, this carrier signal is counted by the ternary counter 411 and sets the S/R flip-flop 402 and hence its $\overline{Q}$ erminal at "1". This signal "1" is delivered to the ternary counter 410 to cause same to stop its counting operation although not described in detail. Thus, the ternary counter 410 does not count the fourth and subsequent Q burst pulses. The output from the invertor 413 is delivered to the ternary counter 410 as well.

Although not described in detail, the ternary counter 410 is released from a state where its counting operation has been stopped when it receives a "1" signal from the invertor 413. Thus, the ternary counter 410 starts its counting operation when it receives a burst pulse after its quiescent period.

The ternary counter 411 counts carrier signals from the ternary counter 410 and, when it counts three carrier signals, outputs a carrier signal to the controller 101. The controller 101 measures (calculates) a carrier frequency, using time data in the counter 407 until it receives a carrier signal from the ternary counter 411.

FIG. 11 illustrates the reception of the control signal shown in FIG. 9A. The operation of the reception control unit 105 will be described more specifically in that case. When the ternary counter 410 outputs a first carrier signal after reception of a leader pulse, the counter 407 has counted the length of time T1 for three cycles of burst pulses. The counter 408 counts a carrier output period X1 for which the output of the one-shot multivibrator 412 is "1". The counter 409 counts a quiescent period Y1 for which the burst pulse output has disappeared and the output of the one-shot multivibrator 412 is "0".

When a burst pulse is output again after a lapse of the quiescent period Y1, the counter 407 continues its counting operation performed so far until the ternary counter 410 outputs a second carrier signal. Thus, when the ternary counter 410 outputs a second carrier signal, the counter 407 has counted the period of T1+T2. In this way, the counter 407 continues its counting operation until the ternary counter 411 outputs a third carrier signal. Thus, the counter 407 counts a period for nine cycles of the burst pulses which are the period T1+T2+T3 and delivers data on the counted period to the controller 101.

The counter 408 counts the carrier output periods X2 and X3 while the counter 409 counts the quiescent periods Y2. The period of one cycle of burst pulses is obtained by multiplication of the count value of the nine cycles (T1+T2+T3) of the burst pulses counted by the counter 407 by the clock cycle and subsequent division of the result of the multiplication by nine. The carrier frequency is obtained by taking the inverse of the determined cycle.

Similarly, a carrier output period and a quiescent period are calculated by multiplication of the count values in the counters 408 and 409 by the clock cycle. The category is determined from the calculated values and is stored temporarily in the RAM 111, as will be described later.

Figure 12:
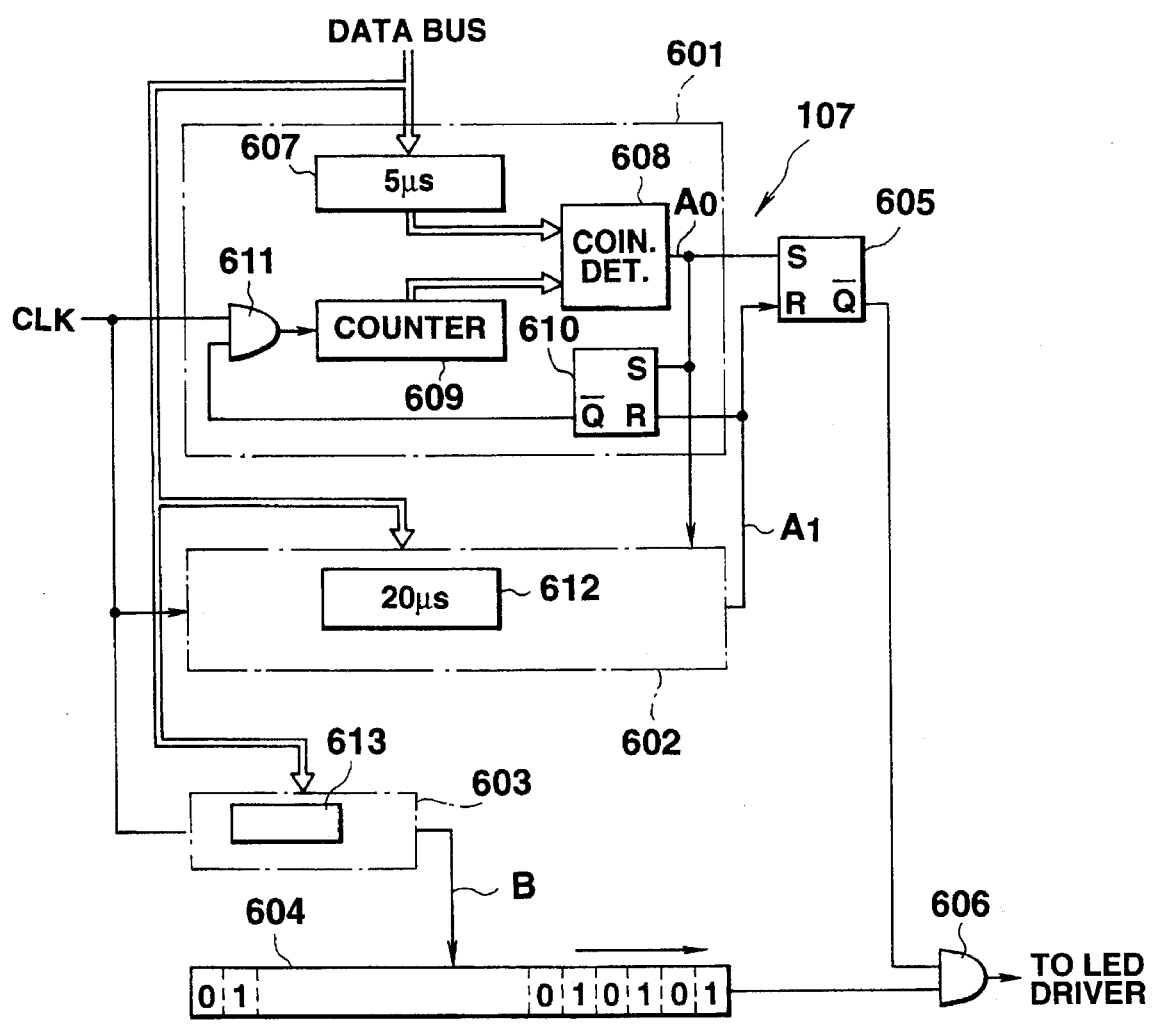
FIG. 12 is a block diagram of a transmission control unit of the remote control device of the second embodiment.

The transmission control unit 107 will be described next. FIG. 12 is a block diagram of the transmission control unit 107. As shown, the transmission control unit 107 includes time length setting units 601, 602 and 603 which set the respective time lengths of control signals to be transmitted, a register 604 whose data is shifted by the time length setting unit 603, an S/R flip-flop 605 set by the time length setting unit 601, and an AND gate 606 which provides for the LED 106 an AND output involving the output of the register 604 and the $\overline{Q}$ terminal output of the S/R flip-flop 605.

The length of a high level period of a burst pulse is set by the controller 101 in the time length output unit 607 of the time length setting unit 601, and data on the set time length is output to a coincidence detector 608, which outputs a "1" signal $A_0$ to the S terminals of the S/R flip-flops 605 and 610, and to the time length setting unit 602 when the output data from the time length output unit 607 coincides with the count value in the counter 609. The counter 609 counts output clock pulses from the AND gate 611, which provides an AND output involving a clock pulse and the $\overline{Q}$ terminal output of the S/R flip-flop 610. Thus, the counter 609 counts clock pulses until the coincidence detector 608 detects the coincidence.

When the coincidence detector 608 detects the coincidence to output a "1" signal $A_0$, the S/R flip-flops 605 and 610 are set, so that their $\overline{Q}$ terminal outputs become "0" together. Until the coincidence detector 608 outputs the "1" signal $A_0$, the Q terminal output of the S/R flip-flop 605 is "1". When the register 604 has output "1" at this time, the AND gate 606 outputs "1" to thereby drive the LED 106, as will be described later. Thus, at this time, a burst pulse having a set high level period is output.

The time length setting unit 602 has a structure similar to that of the time length setting unit 601. Although only a time length output unit 612 as one of the elements of the time setting unit 602 is shown, other elements of the time setting unit 602 should be identified by a bracketed version of reference numerals indicative of the corresponding elements of the time length setting unit 601. Thus, further description thereof will be omitted. The controller 101 sets a lowlevel period of a burst pulse in the time length output unit 612. When the coincidence detector (608) outputs a "1" signal $A_0$, an S/R flip-flop (610) of the time length setting unit (601) and hence the Q terminal output of the S/R flip-flop (610) becomes "1" to thereby cause a counter (609) to perform its counting operation. The time length output unit 612 outputs data on the length of the set burst pulse low level period to the coincidence detector (608). When the count in a counter (609) coincides with that data, the coincidence detector (608) outputs a "1" signal $A_1$ to the S/R flip-flop 605 and the R terminal of the S/R flip-flop 610 of the time length setting unit 601. The signal $A_1$ sets the S/R flip-flop (610). Thus, the S/R flip-flops 605 and the S/R flip-flop 610 of the time length setting unit 601 are reset, so that their Q terminal outputs are both "1". Thus, the counter 609 of the time length setting unit 601 restarts its counting operation, during which time the AND gate 606 maintains its low level.

A carrier output period and a quiescent period are sequentially set in the time length setting unit 603. When each of those set periods has passed, the time length setting unit 603 outputs a signal B (this timer is well known and further description thereof will be omitted). The time lengths corresponding to the carrier output period and the quiescent period are sequentially set by the controller 101 in the time length output unit 613 of the time length setting unit 603. First, when the carrier output period is set, a counter (not shown) starts to count clock pulses. When a coincidence detector (not shown) of the time length setting unit 603 detects the coincidence between the count in the counter and the carrier output period of the time length output unit 613, it outputs a "1" signal B. A quiescent period is set in the time length output unit 613 and the counter starts to count from the beginning. When the time length setting unit 603 outputs a "1" signal B, the contents of the register 604 are shifted rightwards in FIG. 12.

As shown in FIG. 12, "1" and "0" are alternately stored in the register 604 with the rightmost value in the register 604 being output to the AND gate 606. Thus, by changing the period length set in the time length output unit 613, the carrier output period and the halt period are changed.

Figures 13, 15:
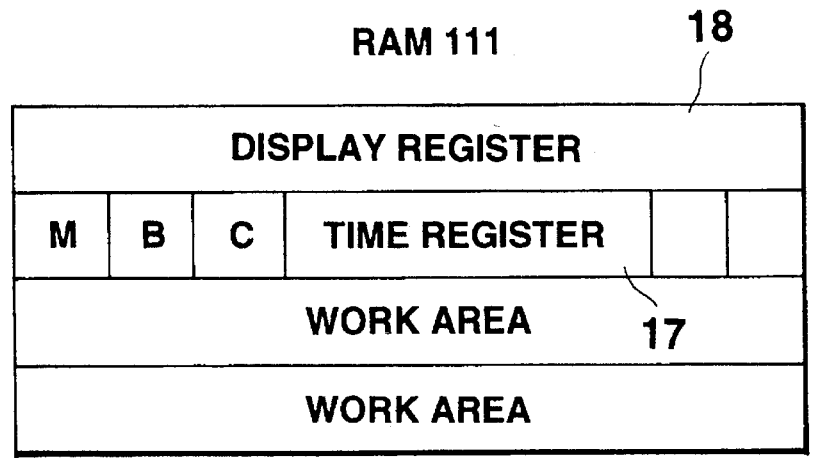
FIG. 13 illustrates the contents of data stored in a RAM of the remote control device of the second embodiment.
FIG. 15 illustrates still further contents of data stored in the RAM.

FIGS. 13–15 illustrate a RAM map indicative of the contents of the RAM 111. FIG. 13 shows a storage area including a display register area 18 which stores data to be displayed on the display 102; M, B and C register areas where data on flags indicative of set modes are stored; a time register area 17 which stores the current time; and a work area. FIG. 14 shows an area which stores a data table for each received control signal. FIG. 15 shows an area which stores category tables each including a combination of a carrier output period and a quiescent period. Tn and Cn ("n" implies a numeral, which applies in the subsequent description) in FIGS. 14 and 15 each denote the address of each table.

A category table stores data on each of signal units constituting a control signal (hereinafter referred to as category data) and classified for the respective categories. For example, data "1.00 ms" and "2.00 ms" are stored at address C0 where "1.00 ms" expresses a carrier output period, and "2.00 ms" expresses a period for which a signal unit is output or the whole output period which is the sum of the carrier output period and the quiescent period. Thus, for the category stored at address C0, the quiescent period is 1.00 ms. The meaning of data stored at other addresses is similar to that just mentioned above.

The data table stores at an address shown by one Tn data required for reproducing a control signal except for the category data. For example, general data on a control signal is stored at addresses An for address T0. Data designating the addresses of the category tables are stored at addresses En in order of the transmission of data on the categories.

More specifically, as general data, "16" is stored at address A0 as one indicating the number of whole data items stored at address T0; "40" is stored at address A1 as a carrier frequency (KHz); "2" is stored at address A2 as the number of times of repetition of control signals; "PEI" is stored at address A3 as a repetition starting address; "PC0" is stored at address E0 as data which designates the address of a category table; "PC1" is stored at address E1; "PC2" is stored at address E2; "PC1" is stored at address E3; and "PC1" is stored at address E4. The "PE1" stored at address A3 as the repetition starting address indicates address E1 in the address T0.

"P" at the head of E1 indicates that this data designates an address. Similarly, data designating an address is identified by "P" added at the head thereof hereinafter. Thus, data stored at address E0 designates the address C0 of the category table, which applies to other data.

As described above, the controller 101 separates a received control signal into data items for the category tables and data tables, and stores them in the RAM 111. Thus, storage of the same category data is avoided to thereby use the memory effectively to reduce the storage capacity of the RAM 111.

The address Tn of a data table is designated by a key in transmission and learning modes to be described later. For example, the data tables T0, T1, T2, . . . are designated by keys "0", "1", "2", . . . , respectively.

The various control operations performed by the controller 101 in the present embodiment will be described next. The remote control device of this embodiment takes the form of a wrist watch and has various functions including that in a timepiece mode. In order to clarify the features of the present invention, only the remote control function will be described.

Figure 16:
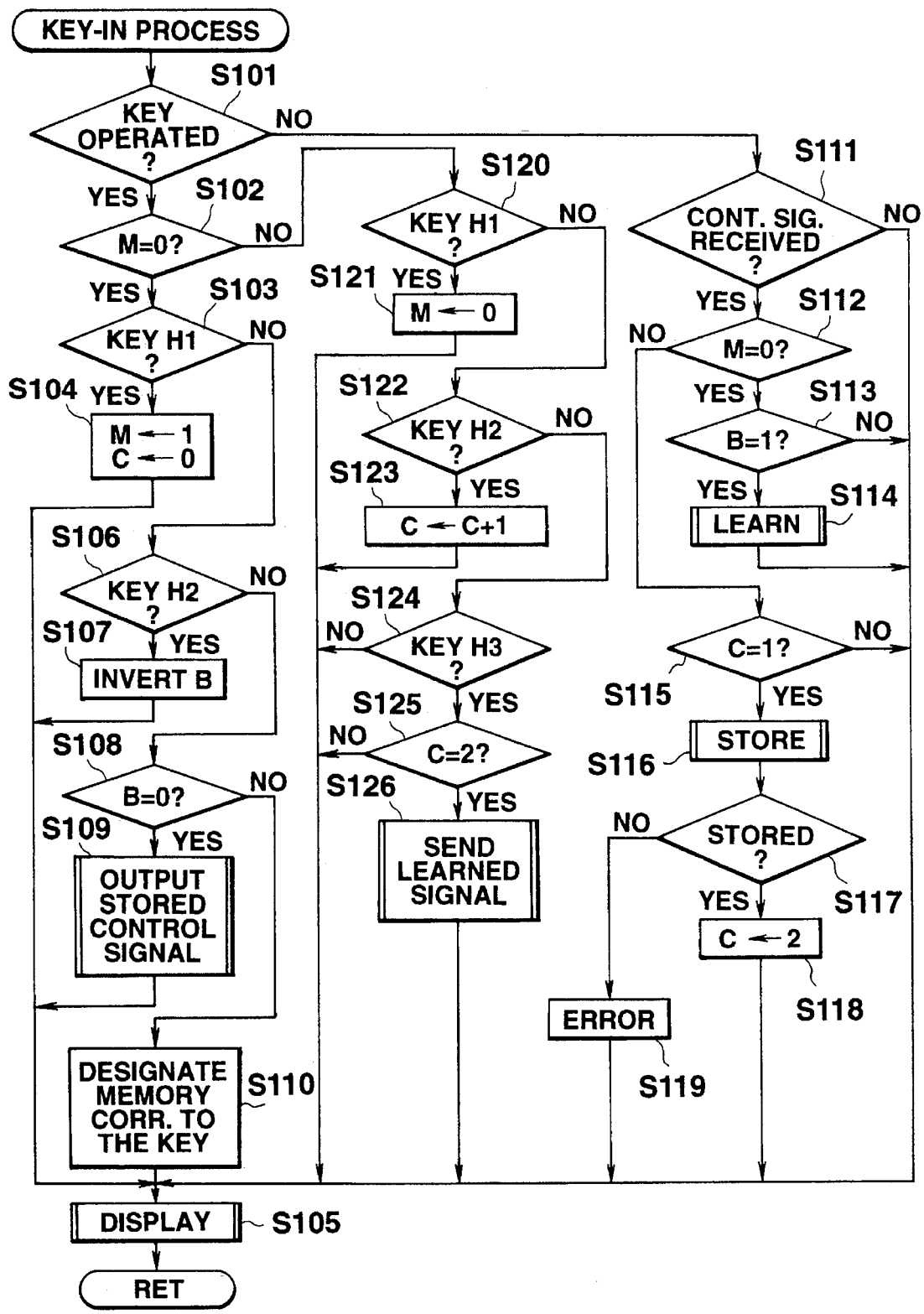
FIG. 16 is a flowchart indicative of a key process performed by the remote control device of the second embodiment.

FIG. 16 is a flowchart indicative of a key-in process which performs sub-processes corresponding to the respective key-in operations. Referring to the flowchart, first, the key-in process will be described. First, the CPU determines whether the key has been operated (step S101). If so, the CPU determines whether the value of the flag M is 0 (step S102). If so, the CPU determines whether the key H1 has been operated (step S103). If so, the CPU sets 1 and 0 at flags M and C, respectively (step S104). The CPU performs a display process corresponding to the value of the flag set in the display 102 (step S105) to end the series of processes.

Figure 17:
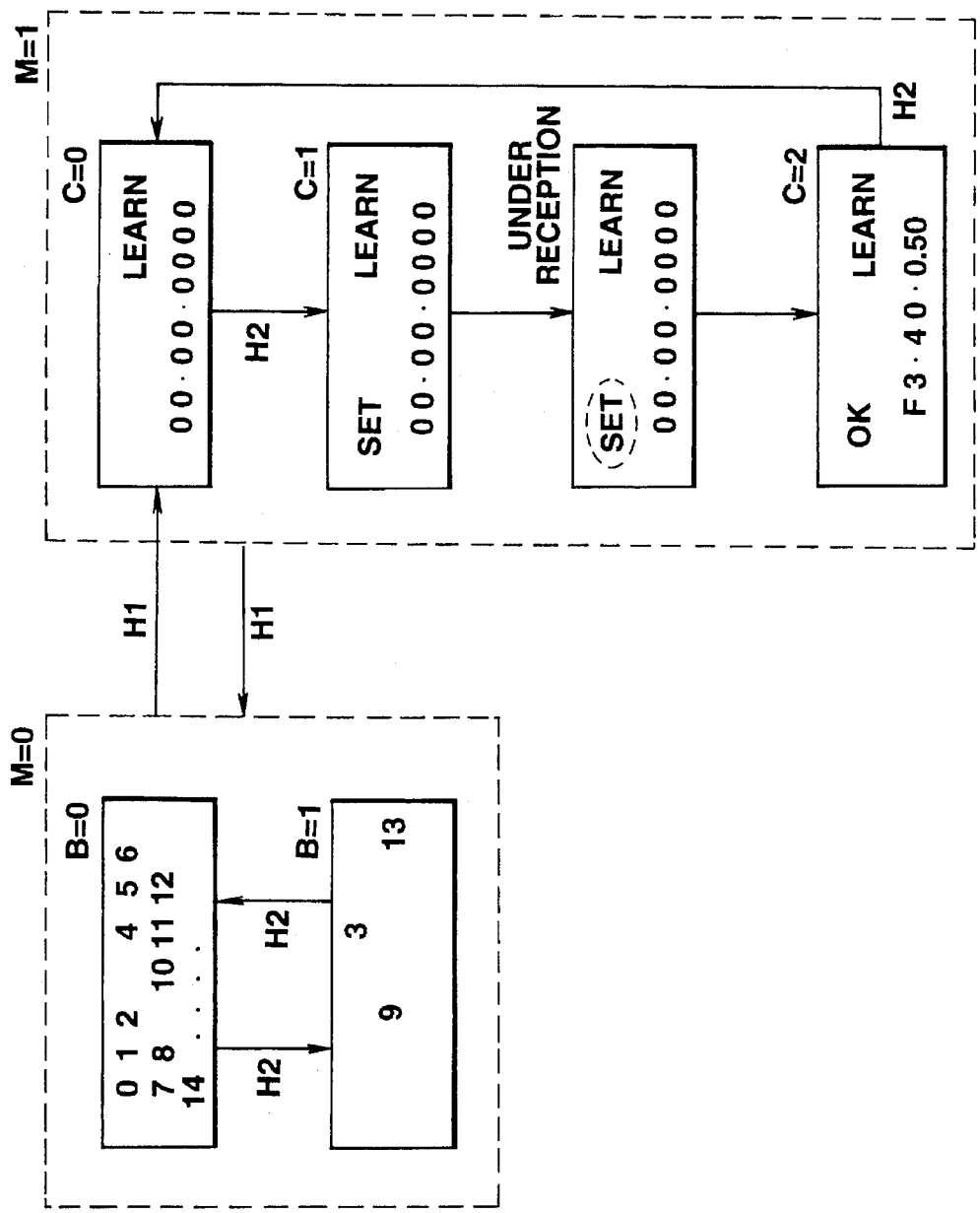
FIG. 17 shows illustrative displays in the second embodiment.

The various modes and displays corresponding to the modes in the present embodiment will be described next. FIG. 17 shows displays on the display 102 of the present embodiment which involve a remote control mode where the value of the flag M is 0 and a learn check mode where the value of the flag M is 1.

The remote control mode includes a transmission mode in which the value of the flag B is 0 to transmit a control signal and a learning mode in which the value of the flag B is 1 to receive and store a control signal. Switching the processing mode from the remote control mode to another mode is performed by the operation of the key H2. In the present embodiment, a control signal is stored in correspondence to a number designated by the ten-key subunit 201. Therefore, in the transmission mode, a key number for which the control signal is stored or the learned number indicative of that key is displayed while in the learning mode, an unlearned key number for which a control signal can be learned is displayed. This number is designated by the operation of the ten-key subunit 201. The decimal point key of the ten-key subunit 201 corresponds to a number "10"; the equal key 11 corresponds to a number "11"; keys F1–F4 correspond to "12"–"15", respectively.

Switching between the remote control mode and the learning check mode is performed by the operation of the key H1. The learning check mode in which the value of the flag M is 1 is used to confirm whether the control signal can be stored correctly. A flag C used in the learning check mode indicates the operating state of the device in the learning check mode. More particularly, the values "0", "1" and "2" of the flag C indicate a release state, a halt state and a learning end state, respectively. When the value of the flag C is 1, a control signal is received. In the present embodiment, "SET" goes on/off during reception of the control signal to indicate that the control signal is under reception. Changing the state from the release one to the halt one and from the learning state to the release state is made by the operation of the key H2.

Referring back to FIG. 16, the subsequent operations of the device will be described next. At step S103 when the CPU determines that the operated key is not the key H1, the CPU determines whether the key H2 has been operated. If so, the CPU inverts the value of the flag B (step S107) and then performs the display process at step S105. At step S106 when the CPU determines that the operated key is not the key H2, it determines whether the value of the flag B is 0 (step S108). If so, or if the transmission mode is set, the CPU sends a control signal which is learned in correspondence to the operated key (step S109) and then performs the process at step S105.

Figures 18, 19:
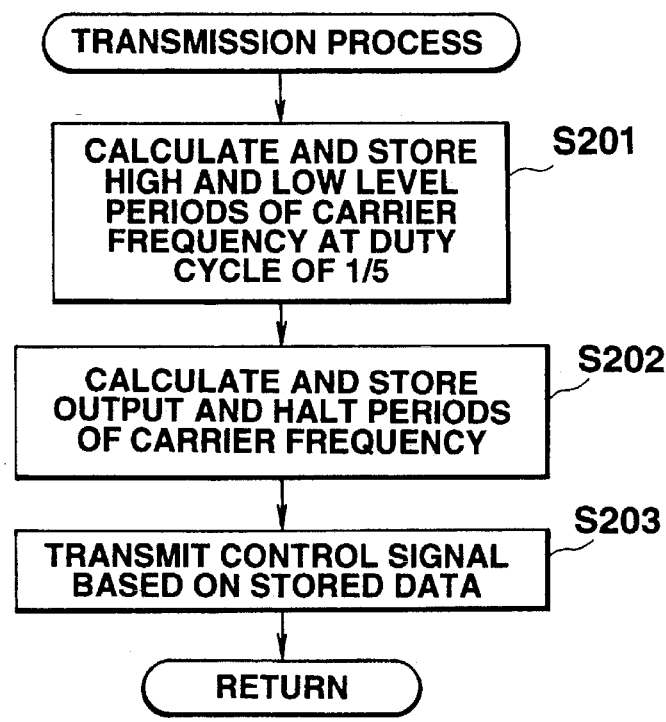
FIG. 18 is a flowchart indicative of a transmission process performed by the remote control device of the second embodiment.
FIG. 19 illustrates the time structure of a control signal.

FIG. 18 is a flowchart indicative of a process for transmission of a control signal, which is performed as a part of the process at step S109. Now, this process for transmission will be described in more detail. First, the CPU reads data on the data table in which a control signal involving a number designated by the operation of the ten-key subunit 201 is stored, calculates a high and a low level period of a burst pulse signal from the read carrier frequency on the basis of a duty cycle of 1/5 and stores the obtained data in the work area of the RAM 111 (step S201). At this time, if the carrier frequency is 40 KHz, the high and low level periods of the burst pulse signal are 5 and 20 μs, respectively.

When the process ends at step S201, the CPU reads data stored at the address of the category table designated by the read data, and calculates and stores the carrier output period and the quiescent period in the work area of the RAM 111 sequentially (step S202). The CPU sends the stored data to the transmission control unit 107 to recover and transmit the corresponding control signal (step S203) to thereby end the series of the processes.

FIG. 19 shows data stored so in the work area of the RAM 111. Starting with the left-hand end of FIG. 19, 5 μs denotes a pulse width (high level period) of the burst pulse signal; 20 μs, a low level period of the burst pulse signal; 1 ms, a carrier output period of a leader pulse; 1 ms, a quiescent period of the reader pulse; 0.5 ms, a carrier output period of a logical value "0"; 0.5 ms, a quiescent period of the logical value "0"; 0.5 ms, a carrier output period of a logical value "1"; and 1 ms, a quiescent period of the logical value "1". Thus, in the transmission of the control signal of FIG. 7, it is required that a period length of 5 μs is set in the time length output unit 607 of the transmission control unit 107; a period of 20 μs is set in the time length output unit 612; and period lengths of 1, 1, 0.5, 0.5, 0.5 and 1 ms are set sequentially in this order in the time length output unit 613.

In the present embodiment, a duty cycle which involves a proportion of a high level period of the burst pulse signal occupied in its single cycle) is 1/5. Thus, assuming that the carrier frequency is 40 KHz (at this time, its cycle is 25 μs), 5 and 20 μs are set in the time length output units 607 and 612, respectively. The reason why the duty cycle of 1/5 is used in the present embodiment is that the employment of that duty cycle raises no problem in the operation of the device although many control signals use a duty cycle of 1/3 generally.

Referring back to FIG. 16, when the CPU determines that the value of the flag B is not 0 at step S108, or when a key has been operated in the learning mode of B=1, the CPU stores in the work area an address at which a data table for a control signal involving a number designated by the operated key is stored to designate that address (step S110), and then performs a display process at step S105.

When at step S101 the CPU determines that there are no keys operated, the CPU determines whether a control signal has been received (S111). If not, the CPU performs the process at step S105. Conversely, when the CPU determines that the control signal has been received at step S111, the CPU determines whether the value of the flag M is 0 (step S112). If so, the CPU determines whether the value of the flag B is 1 (step S113). If not, the CPU performs the display process at step S105. Conversely, when the CPU determines that the value of the flag B is 1, the CPU performs a learning process where the control signal is learned (step S114), and then performs the display process at step S105.

A learning process at step S114 will be described with respect to a flowchart of FIG. 20. First, a control signal is received by the photodiode 104 (step S301). The counter 407 counts clock pulse signals for the cycle of the burst pulses and calculates the carrier frequency on the basis of the counted clock pulses (step S302). The counters 408 and 409 count clock pulses for the lengths of a carrier output period and a quiescent period, respectively. The CPU calculates the lengths of the carrier output period and the quiescent period on the basis of the respective values of the counts (step S303). The CPU then determines the categories of the signal units on the basis of the respective calculated periods, stores data on the respective periods at an address Tn in the RAM 111 of FIG. 14 corresponding to the key designated at step S110 of FIG. 16 (step S304), and then ends the series of processes.

When the learning of the control signal ends, the CPU performs the display process at step S105 of FIG. 16. In the display process, the CPU erases the display of the number indicative of the learned controlled signal (FIG. 17) to thereby inform the user of the termination of the learning process.

Referring back to FIG. 16, when the CPU determines at step S112 that the value of the flag M is not 0 or that the learning check mode is set, the CPU determines whether the value of the flag C is 1 (step S115). If not, the CPU performs the display process at step S105. Conversely, when the CPU determines that the value of the flag C is 1, the CPU performs a storage process similar to the learning process (step S116) and determines whether the control signal is stored in the RAM 111 in the storage process (step S117). If so, the CPU sets the flag C at 2 (step S118). The CPU then performs the step S105. If not at step S117, the CPU determines that there was an error such as an overflow or malfunction (step S119).

The CPU then performs the step S105, where if the flag C is set at 2, the CPU displays "OK" and information on the contents of the learned control signal, as shown in FIG. 17. Conversely, if the CPU determines that there was an error, it displays "Er" at the position of the display "OK" to inform the user of the result of the learning.

When the flag C has been set at 2, "F3", "40" and "0.50" are displayed in addition to the display of the "OK" in the example of FIG. 17. Those displays are concerned with the contents of the learned control signal. More specifically, "F3" indicates that the number of categories of the learned control signals is 3; "40" indicates that the carrier frequency is 40 KHz; and "0.50" indicates that the carrier output period is 0.50 ms.

The confirmation of the learning function performed at a stage preceding that involving the forwarding of the articles is generally performed by learning a predetermined control signal. Thus, by comparison of the contents of the learned control signal with the contents of the result of the leaning of the control signal displayed in the learning check mode, the learning function is confirmed. Therefore, the number of steps of the confirming work is reduced, the confirming work is facilitated, the time required for the confirming work is reduced, and the efficiency of the confirming work is improved.

At step S102 of FIG. 16 when the CPU determines that the value of the flag M is not 0, the CPU determines whether the key H1 has been operated (step S120). If so, the CPU sets the flag M at 0 (step S121). The CPU then performs the step S105. Conversely, when the CPU determines that the key H1 is not operated, the CPU determines whether the key H2 has been operated (step S122). If so, the CPU increments the value of the flag C (step S123) and then performs the step S105.

At step S122 when the CPU determines that the key H2 has not been operated, the CPU determines whether the key H3 has been operated (step S124). If not, the CPU performs the process at step S105. Conversely, when the CPU determines that the key H3 has been operated, the CPU determines whether the value of the flag C is 2 (step S125). If not, the CPU then performs the process at step S105. Conversely, when the CPU determines that the value of the flag C is 2, the CPU transmits the control signal learned in the learning check mode (step S126) and performs the step S105. The process at step S126 is similar to that at step S109.

As just described above, in the present embodiment, the control signal learned in the learning check mode can be transmitted directly by the operation of the key H3. Thus, simultaneously with the confirmation of the leaning function of the articles, the reproduction of the control signal is confirmed. Therefore, the confirming work is further facilitated to thereby improve the efficiency of the confirmation.

As shown in FIG. 17, the result of the learning of the control signal in the present embodiment is displayed as the number of categories, carrier frequency, and carrier output period because those information items are main information of the control signal. However, if an area where such information is displayed is narrow as in the present embodiment, those information items may not be displayed correctly.

THIRD EMBODIMENT (FIG. 21)

Figures 20, 21:
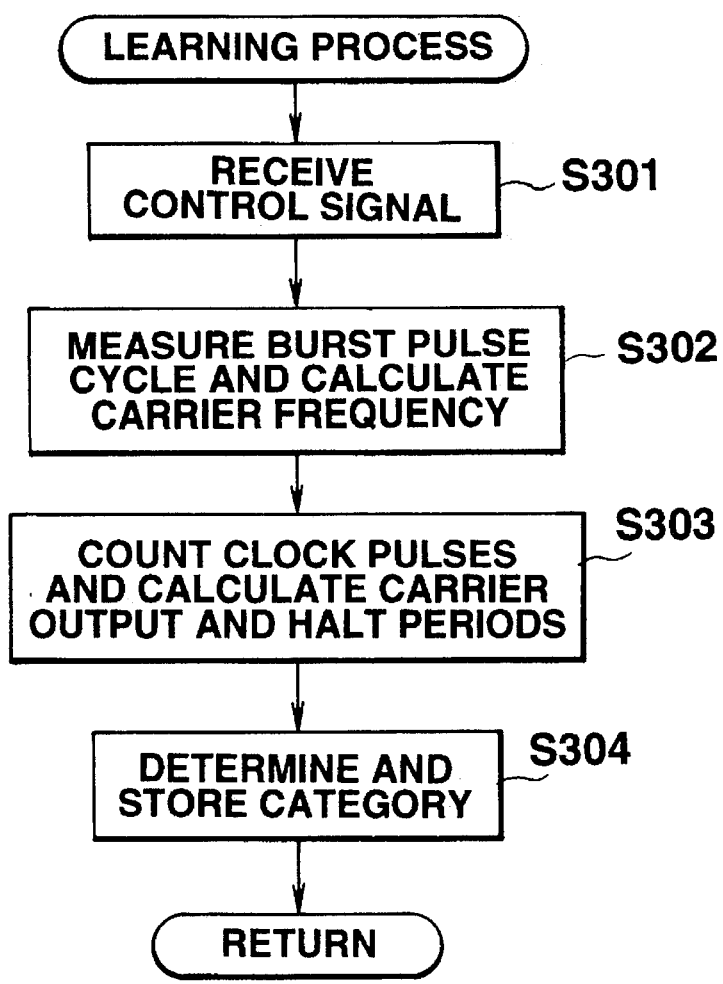
FIG. 20 is a flowchart indicative of a learning process performed by the remote control device of the second embodiment.
FIG. 21 shows an illustrative display of a result of learning in a third embodiment.

FIG. 21 illustrates displays of the result of the learning in a third embodiment to avoid such problem just mentioned above. In FIG. 21 "F5" indicates that there are five categories; "34" indicates the carrier frequency; and "0464" indicates the carrier output period. Assuming that the unit of the burst pulse cycle is 0.5 µs and the unit of the carrier output period is 8 µs as a specified example, FIG. 21 indicates that the carrier frequency is 1÷(34×0.5)=38.46 KHz and the carrier output period is 0464×8=3.712 ms. Thus, by selection of appropriate values as the units of the carrier output period and the carrier frequency, the carrier frequency and the carrier output period are displayed more precisely.

While in the present embodiment the contents of the result of the learning of the control signal are displayed only when the learning check mode is set, the learned contents of a control signal may be displayed each time this control signal is learned without setting the learning check mode. Also, in this case, the efficiency of the confirming work is improved as well.

The control signals include many kinds of signals involving a whole fixed output period/whole output period burst, a whole fixed output period/carrier output period modulation, a fixed quiescent period/carrier output period modulation, and a whole fixed output period/number-of-carrier-output-period modulation. Thus, display of the contents of the result of the learning is not limited only to that in the present embodiment, but may be displayed in dependence on displayable areas and the kinds of control signals to be handled. For example, the number of signal units which constitute a control signal and its whole output period may be displayed. The present embodiment may be modified such that a plurality of contents to be displayed is set beforehand and the displayed contents may be changed each time a key such as the key F3 is operated.

What is claimed is:

1. A remote control device comprising:

plural input keys corresponding respectively to various key functions;

function indicating means for indicating the various key functions of said plural input keys;

plural remote-control signal storing means corresponding respectively to said plural input keys, for storing remote-control signals externally supplied thereto, respectively;

mode setting means for setting a storing mode in which an externally supplied remote-control signal is received and stored in the remote-control signal storing means, and a transmitting mode in which the remote-control signal stored in the remote-control signal storing means is read out and transmitted;

first control means for indicating all the key functions of the input keys and the remote-control signal storing means corresponding to which input keys store no remote-control signal, on said function indicating means in the storing mode set by said mode setting means;

first selecting means for selecting one of the input keys, whose key functions are caused by said first control means to be indicated on said function indicating means;

storage control means for storing the externally supplied remote-control signal in the remote-control signal storing means corresponding to the input key selected by said first selecting means;

second control means for indicating all the key functions of the input keys and the remote-control signal storing means corresponding to which input keys store remote-control signals, on said function indicating means in the transmitting mode set by said mode setting means;

second selecting means for selecting one of the input keys, the key functions of which are caused by said second control means to be indicated on said function indicating means; and sending means for sending the remote-control signal stored in the remote-control signal storing means corresponding to the input key selected by said second selecting means.

2. A remote control device according to claim 1, wherein:

said plural input keys comprise ten keys for entering numeral data and operation keys for performing operations on the numeral data, and said function indicating means is provided with numeral indicating elements for indicating the numeral data and operation indicating elements for indicating the operations corresponding to the operation keys.

3. A remote control device according to claim 1, further comprising:

mode indicating means for indicating that the storing mode has been set by said mode setting means.

4. remote control device according to claim 1, wherein said remote control device is mounted in a wrist watch.

5. A remote control device according to claim 1, wherein:

said function indicating means indicates the key function corresponding to the input key selected by said first selecting means in a flashing manner, when said storage control means has finished storing the remote-control signal in the remote-control signal storing means corresponding to the input key selected by said first selecting means.

6. A remote control device according to claim 1, wherein said externally supplied remote-control signal comprises a carrier signal and a pause time, and said remote-control signal storing means stores frequency data of the carrier signal and time data of the pause time.

7. A remote control device according to claim 6, further comprising:

a signal display means for displaying the frequency data and the time data of the remote-control signal stored in said remote-control signal storing means.

8. A remote control device comprising:

receiving means for receiving a remote-control signal externally supplied thereto, the remote-cOntrol signal including a carrier signal and a pause time;

plural input keys corresponding respectively to various key functions;

plural remote-control signal storing means corresponding respectively to said plural input keys, each adapted for storing a remote-control signal received by said receiving means;

mode setting means for setting a storing mode and a transmitting mode;

first selecting means for selecting one of the plural input keys in the storing mode set by said mode setting means;

storing control means for storing the control signal received by said receiving means in the remote-control signal storing means corresponding to the input key selected by said first selecting means;

second selecting means for selecting one of the plural input keys in the transmitting mode set by said mode setting means;

transmitting means for transmitting the control signal stored in the remote-control signal storing means corresponding to the input key selected by said second selecting means; and signal display means for displaying the carrier signal and the pause time included in the remote-control signal stored in said remote-control signal storing means by said storing control means.

9. A remote control device according to claim 8, wherein said plural input keys comprise ten keys for entering numeral data and operation keys.

10. A remote control device according to claim 8, further comprising:

mode display means for indicating that the storing mode has been set by said mode setting means.

11. A remote control device according to claim 8, wherein said remote control device is mounted in a wrist watch.

12. A remote control device according to claim 8, further comprising:

announce means for announcing that said storing control means has finished storing said the remote-control signal in the remote-control signal storing means corresponding to the input key selected by first selecting means.

\* \* \* \* \*